(12) United States Patent
Porter (10) Patent No.: US 11,333,478 B1
(45) Date of Patent: May 17, 2022

(54) MARKING DEVICE HOLDER (71) Applicant: Chris Patrick Porter, Lovelock, NV (US)

(72) Inventor: Chris Patrick Porter, Lovelock, NV (US)

( * ) Notice: Subject to any disclaimer, the term of this patent is extended or adjusted under 35 U.S.C. 154(b) by 71 days.

(21) Appl. No.: 16/879,456

(22) Filed: May 20, 2020

Related U.S. Application Data (60) Provisional application No. 62/850,434, filed on May 20, 2019.

(51) Int. Cl.
*G01B 3/1089* (2020.01)

(52) U.S. Cl.
CPC ................................. *G01B 3/1089* (2020.01)

(58) Field of Classification Search
USPC ........................................................... 33/770
See application file for complete search history.

(56) References Cited

U.S. PATENT DOCUMENTS

| | | | | |
|---|---|---|---|---|
| 1,988,095 A * | 1/1935 | Stockman | ............ | G01B 3/1061 33/27.03 |
| 6,725,560 B2 | 4/2004 | Smith | | |
| 6,804,898 B1 * | 10/2004 | Hsu | ........................ | B43K 8/003 33/668 |
| 6,935,045 B2 * | 8/2005 | Cubbedge | ............ | G01B 3/1071 33/42 |
| 7,490,415 B1 * | 2/2009 | Cubbedge | ............ | G01B 3/1071 33/770 |
| 7,823,294 B2 * | 11/2010 | Contreras | ................. | B43L 9/04 33/27.03 |
| 7,886,447 B2 * | 2/2011 | Cruz | ........................ | B26B 29/06 33/41.5 |
| 8,464,436 B2 | 6/2013 | Smith | | |
| 8,522,447 B1 * | 9/2013 | Novotny | ............... | G01C 15/105 33/770 |
| 9,188,418 B2 * | 11/2015 | Mamatkhan | ......... | G01B 3/1084 |
| 2003/0182811 A1 * | 10/2003 | Hairapetian | .............. | B43L 9/04 33/27.032 |
| 2007/0220760 A1 * | 9/2007 | Price | ......................... | B43L 7/12 33/42 |
| 2014/0165414 A1 | 6/2014 | Smith | | |
| 2014/0317943 A1 * | 10/2014 | DeMartinis | .......... | G01B 3/1084 33/668 |
| 2015/0113821 A1 * | 4/2015 | Fulton | .................. | G01B 3/1084 33/767 |
| 2015/0233691 A1 * | 8/2015 | Higginbotham | ..... | G01B 3/1061 33/760 |

* cited by examiner

*Primary Examiner* — Christopher W Fulton
(74) *Attorney, Agent, or Firm* — R. Dabney Eastham (57) ABSTRACT

A marking device holder for use with a tape measure has a body with a curved cavity defined in it for receiving and holding the tape of the tape measure and a second cavity for receiving and holding a marking device generally orthogonal to the tape. The marking device holder can be placed on the tape at any desired location to enable the marking device to mark a work piece adjacent to the tape. The marking devise holder may be provided with a rectangular cavity for receiving a lath in order to make repetitive measurements of the same length.

19 Claims, 9 Drawing Sheets

MARKING DEVICE HOLDER

CROSS-REFERENCE TO RELATED APPLICATION

This non-provisional application claims benefit and priority under 35 U.S.C. § 119(e) of U.S. provisional patent application Ser. No. 62/850,434, filed on May 20, 2019 and titled "Marking Device Holder," the contents of which are incorporated by reference for all purposes.

TECHNICAL FIELD

The field of the invention is that of measuring devices.

BACKGROUND ART

Carpenters and other workmen use tape measures for measuring out predetermined distances of materials such as lumber and drywall. A typical tape measure has a container dispensing a graduated tape with a metal catch at the end shaped to have a ninety-degree angle. The container usually has a recoiling mechanism or a winding mechanism in order to retrieve the extended tape. A locking switch may be provided in a container that has a recoiling mechanism, in order to secure the tape in a predetermined position when the tape is extended. The release of the locking switch allows the tape to be recoiled into the housing.

Tape measures have for a long time routinely been used by a wide variety of tradespeople such as carpenters and other workmen together with other utensils to measure, mark, cut, score, and scribe various materials. The other utensils usually are a pencil or marker used to indicate a particular length. Present tape measures are convenient if the user needs only to make one or two marks in a convenient position.

Often, however, the user will have to create a series of marks at the same distance over and over. Frequently these distances will be end-to-end such as for studs in a wall or rows of shingles on a roof. This requires locating the desired length on the tape each time and can be time consuming, especially when the length includes an odd fraction such as ⅜ inches. Adding odd fractional measurements can also be a source of human error. Other methods require striking a line (or cutting) parallel to an edge, often employed by those cutting plywood or drywall to narrow the material by a certain measurement. This is accomplished by maintaining a length of the tape, generally by using the tape brake provided on the case, and holding a utensil such as a knife or pencil against the tape measure case while sliding the tape hook on the end of the tape along an edge. This method may fail to create a uniformly straight line because the utensil may slip out of position, or the tape brake may slip.

In some instances the measurement is not critical, but a consistency of measurement is. For example, the user may wish to paint a border on a wall. Visually, the thickness may need to be consistent. Therefore, a means of establishing a consistent length with the ability to mark would be useful. Also, a measurement may need to be transferred from one distance to another. For example, a workman installing drywall may need a particular length of material to finish a wall. Currently, he will take the measurement, record it, perhaps just in memory, then recall the measurement when marking and cutting the required piece. This, of course, can be another source of error such as by failure to recall the correct measurement. A means of transferring the measurement physically could avoid a costly mistake as well as saving time by not having to discern exact measurements, first on the wall and again when cutting the material.

Tape measures also are used to draw arcs and circles. These actions are made difficult by the need to hold the marking device next to the tape or tape measure.

SmithWorks of Lafayette, Colo. sells a tape measure under the trademark PencilMan™ that performs this function. The PencilMan™ tape measure has an integral device mounted on the tape measure that is adapted to hold a marking device. The user of the PencilMan™ tape measure pulls out the tape until the point of the marking device is adjacent the chosen gradation on the tape, and then positions the tape against the work piece in order to direct the point of the marking device against the work piece and thus mark the work piece at the appropriate location.

A workman need use only one hand to measure and mark a work piece with a PencilMan™ tape measure after extending the tape as described, placing the end of the tape at a reference position, and then marking the work piece by moving the marking device against the work piece. With two hands or even one hand the user can employ the PencilMan™ tape measure to perform parallel side marking, draw arcs and circles, do multiple marking, and do end-to-end marking.

U.S. Pat. No. 8,464,436 B2 to Braden L. Smith for a "tape measure with utensil holder and tape brake" describes the PencilMan™ tape measure. An earlier patent, U.S. Pat. No. 6,725,560 B2 to Braden L. Smith, describes a "releasable marking attachment for a tape measure" that enables a tape measure to be equipped with a marking device holder like the marking device included as part of the PencilMan™ tape measure.

The PencilMan™ tape measure with utensil holder and tape brake, and the releasable marking attachment for a tape measure described by U.S. Pat. No. 6,725,560 B2, provide marking device holders that have a number of parts, some of them moving. The marking device is required to be adjacent to the tape measure container and the tape must be extended or contracted to bring the marking device adjacent the chosen gradation.

A simpler and less expensive marking device holder that is not confined to the vicinity of the container of a tape measure and that could be used with any tape measure is desirable. Also desirable is a marking device holder that may be used with readily obtained construction materials such as laths.

SUMMARY OF INVENTION

In one embodiment, a marking device holder is provided for use with a tape measure of the when the tape is extended from a case of the tape measure in order to facilitate the marking of lengths, arcs, or circles on a work piece. The marking device holder may have a body defining a cavity adapted to releasably receive the tape and at least one marking device-receiving cavity adapted to receive and hold a marking device, preferably generally orthogonal to a length of the tape. The body may be made in one piece by molding, milling, or 3-D printing.

In another embodiment, a marking device holder is provided for use with a lath or thin board. The marking device holder may have a body with rectangular cavities defined at one end for receiving a lath or thin board to facilitate the marking of lengths, arcs, or circles on a work piece.

The features of these embodiments may be combined by providing a marking device holder for use with either or both a tape measure or a lath or thin board. Such a marking device holder may have a body defining a cavity adapted to releasably receive the tape as well as rectangular cavities defined at one end for receiving a lath or thin board, and at least one marking device-receiving cavity adapted to receive and hold a marking device, preferably generally orthogonal to a length of the tape or the lath or thin board.

An object of the invention is to provide a lightweight and inexpensive marking device holder for attachment to the tape of a tape dispenser or a lath.

A further object of the invention is to a lightweight and inexpensive marking device holder for attachment to the tape of a tape dispenser or a lath that has no moving parts.

BRIEF DESCRIPTION OF DRAWINGS

Other objects, features, and advantages of the present invention will become more fully apparent from the following detailed description of preferred embodiments, the appended claims, and the accompanying drawings in which:

DESCRIPTION OF EMBODIMENTS

Figure 1:
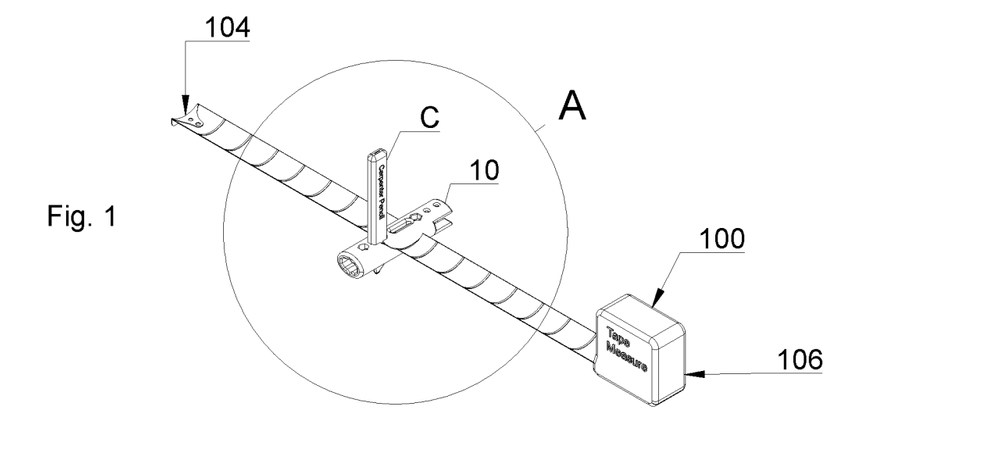
FIG. 1 is a perspective view of a tape measure with a portion of the tape extended and with an embodiment of the marking device holder according to the invention mounted on the extended portion of the tape, with a marking device, namely a carpenter's pencil, inserted into the marking device holder.
Figure 2:
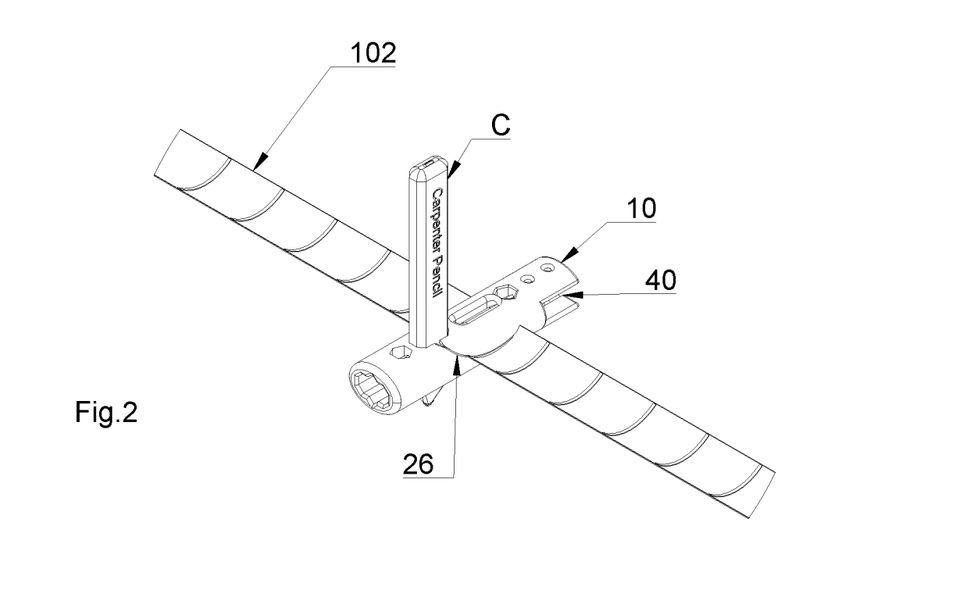
FIG. 2 is an expanded perspective view of a portion of FIG. 1, indicated by the circle A in that drawing, showing the embodiment of the marking device holder and carpenter's pencil of FIG. 1 mounted on the extended portion of the tape of the tape measure.

The tape measure 100 shown in FIGS. 1 and 2 is a tape measure of a well-known kind and is in common use today. The tape 102 is pre-stressed so that as it is deployed the tape 102 will assume a curved transverse cross-section, so that the side of the tape that is viewed from above is concave and the other side when viewed from below will be convex, as shown in FIGS. 1 and 2. The concave side bears distance markings.

The transverse curvature of the tape 102 allows the extended tape 102 to have a useful rigidity for measuring. The rigidity allows a workman to measure from a surface by abutting the end of the tape 102 against that surface, such as in measuring from the corner of a wall along the floor. Conversely, the workman can place the hook or end 104 of the tape 102 over an edge and extend the tape 102 from that edge, as in measuring from the edge of a board or sheet of plywood.

The tape 102 is flexible. The transverse curvature of the tape 102 will not prevent the tape 102 from rolling up into the case 106 of the tape measure 100 when the tape 102 is retracted into that case 106. The hook 104 at the end of the tape 102 prevents the tape from retracting all the way into the case 106.

The tape measure 100 may be of the recoiling kind. The internal spindle (not shown in the drawings) on which the tape 102 is wound has a spring attached that tends to wind the spindle in order to retract the tape 102 within the case 106. The tape measure 100 may have a brake (not shown in the drawings) to resist the retraction and keep the tape 102 extended when desired.

Other tape measures are known that have flat tapes, that is, tapes that are not stressed to adopt a curved transvers cross-section. The marking device holder according to the invention that is described below can work with tape measures that have flat tapes.

An embodiment 10 of a marking device holder according to the invention is shown in FIGS. 1 and 2 to be mounted on the tape 102 that extends from the tape measure case 106. The marking device holder 10 is shown holding a marking device C. The marking device C shown in FIGS. 1 and 2 is a carpenter's pencil.

The marking device holder 10 has a body 12 that preferably is formed in a generally cylindrical shape with a longitudinal axis 11. The body 12 preferably is formed in one piece, such as by 3-D printing, molding, or stamping. The material of the body 12 preferably is a plastic such as polypropylene or polyethylene but other materials such as metals or wood may be used. The body 12 may be formed in other shapes as desired, such as rectangular parallelepipeds or even ornamental designs. A cylindrical shape, however, uses less material.

The body 12 as shown in the drawings has a first end 14, a second end 16, a top side 18, a bottom side 20, a left side 22, and a right side 24. Since the body 12 is generally cylindrical, the walls 18, 20, 22, and 24 preferably merge into each other with no definite dividing lines or edges.

The body 12 has a number of cavities and openings defined in it. First, a crescent-shaped cavity or slot 26 is defined in the body 12. The cavity 26 is open to the exterior of the body 12 at the top side 18 of the body 12 and is also open down the left side 22 and the right side 24. The cavity 26 extends through the body 12 from the left side 22 to the right side 24. The purpose of the cavity 26 is to admit the entrance of the tape 102 of a tape measure 100 so the marking device holder 10 can be slid onto the tape 102 as shown in FIGS. 1 and 2. The cavity 26 is crescent-shaped or curved (concave upwardly) to accommodate the concave cross-section of the tape 102 of the tape measure 100. The cavity 26 may also accommodate flat tapes if those tapes are flexible enough to bend so as to have a curved cross-section, that is, bend about an axis parallel to the length of the tape.

The cavity 26 is sized and shaped to admit the tape 102 so the marking device holder 10 can slide onto and off the tape 102. The sides of the cavity 14 are close enough to each other that they will contact the tape 102 and retain the marking device holder 10 in a given position on the tape 102 due to friction.

The body 12 has three marking device-receiving cavities defined in it that extend transversely to the longitudinal axis 11 of the body 12, from the top side 18 to the bottom side 20. The larger marking device-receiving cavity 28 is sized to accommodate and hold a carpenter's pencil C as shown in FIGS. 1 and 2. The carpenter's pencil C preferably is inserted into the cavity 28 after the tape 102 is inserted into the cavity 28, as shown in FIGS. 1 and 2. The carpenter's pencil C contacts the tape 102 and holds it in place by preventing the tape 102 from sliding out of or through the cavity 26.

The smaller marking device-receiving cavities 30 and 32 are sized to hold no. 2 pencils P (as in FIGS. 15 and 16) in addition to or as an alternative to the carpenter's pencil C. The marking device-receiving cavities 28, 30, and 32 could be adapted to receive other kinds of marking devices, such as other kinds of pencils, pens, or scribes, by providing an appropriate size and cross-section for these cavities if the other kinds of marking devices will not fit into cavities intended for carpenter's pencils or no. 2 pencils.

As shown in the drawings, the axes of the marking device-receiving cavities 28, 30, and 32 preferably are aligned transversely or orthogonal to the longitudinal axis 11 of the body 12 and will hold the marking devices transversely to the longitudinal axis 11 of the body 12. However, the angle of alignment of the marking device-receiving cavities 28, 30, and 32 need not be perpendicular or transverse to the longitudinal axis 11. Other angles and alignments might be chosen for one or all of the cavities 28, 30, and 32. Preferably, the respective marking devices will be directed below the tape 102.

The marking device-receiving cavities 28, 30, and 32 are shown in the drawings to extend from the top side 18 to the bottom side 20 and transversely to the longitudinal axis 11 of the body 12. However, one or more of the marking device-receiving cavities 28, 30, and 32 may be formed to have an axis that is transverse to the longitudinal axis 11 but also rotated about the longitudinal axis 11 and therefore no longer extending directly from the top side 18 to the bottom side 20.

Figure 5:
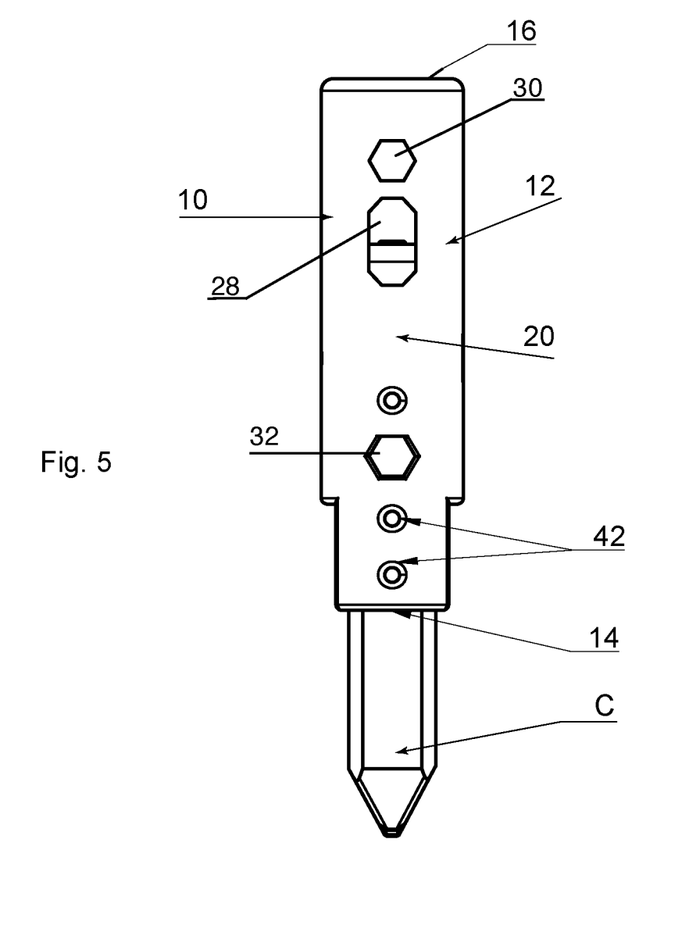
FIG. 5 is a plan view of the bottom side of the marking device holder shown in FIG. 1 wherein a carpenter's pencil that is inserted in the marking device holder.
Figure 6:
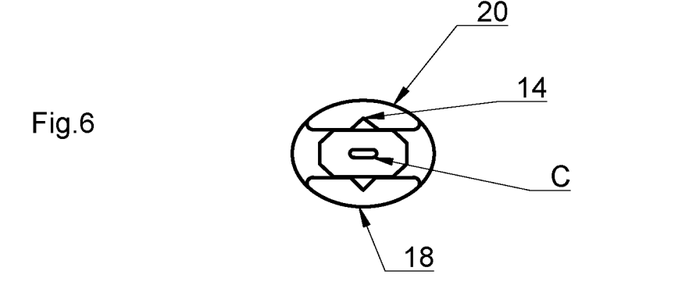
FIG. 6 is a plan view of a first end of the marking device holder shown in FIG. 1 with the carpenter's pencil inserted.
Figure 7:
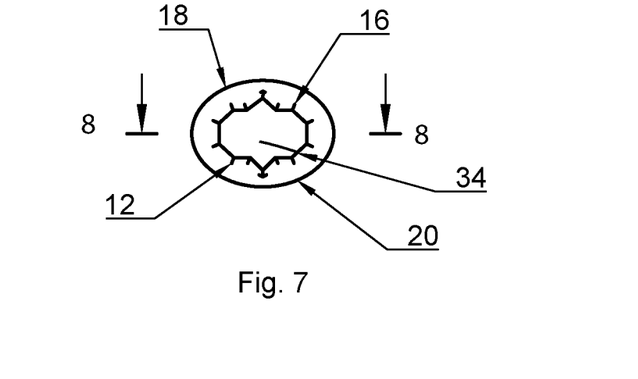
FIG. 7 is a plan view of a second end of the marking device holder shown in FIG. 1, without a carpenter's pencil having been inserted into the marking device holder.
Figure 8:
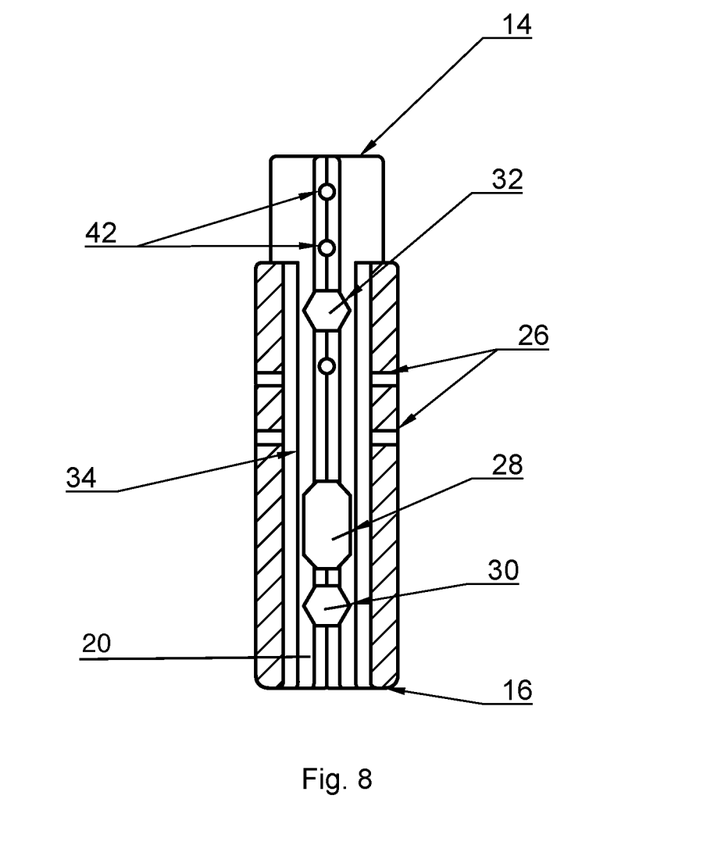
FIG. 8 is a cross-sectional view of the marking device holder shown in FIG. 1, taken along the plane 8-8 shown in FIG. 7, looking down towards the bottom side.
Figure 9:
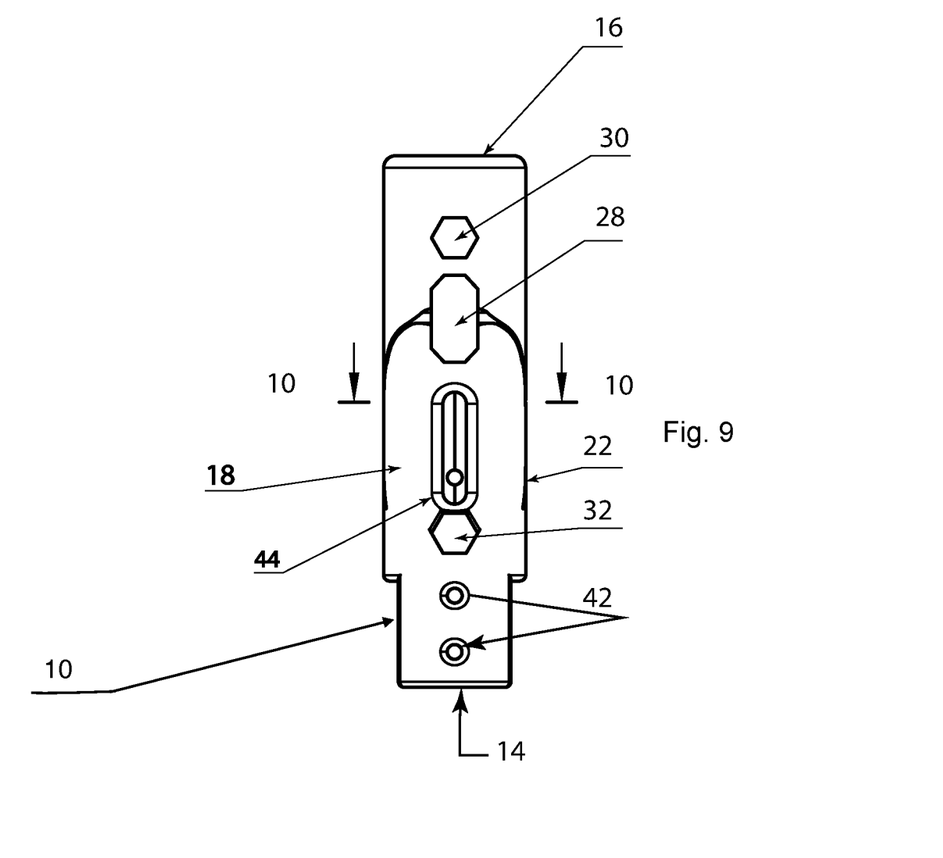
FIG. 9 is a plan view of the top side of the marking device holder shown in FIG. 1.
Figure 10:
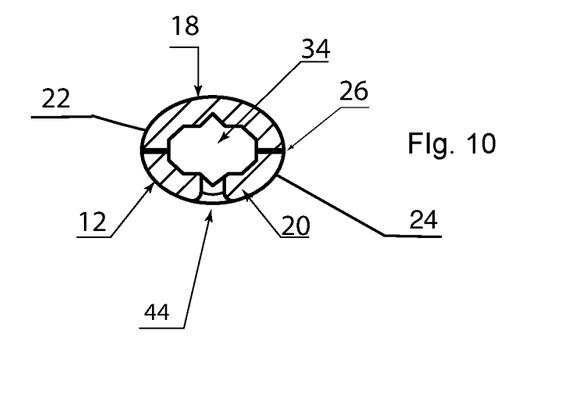
FIG. 10 is a cross-sectional view of the marking device holder of FIG. 1 taken along the plane 10-10 shown in FIG. 9.
Figure 11:
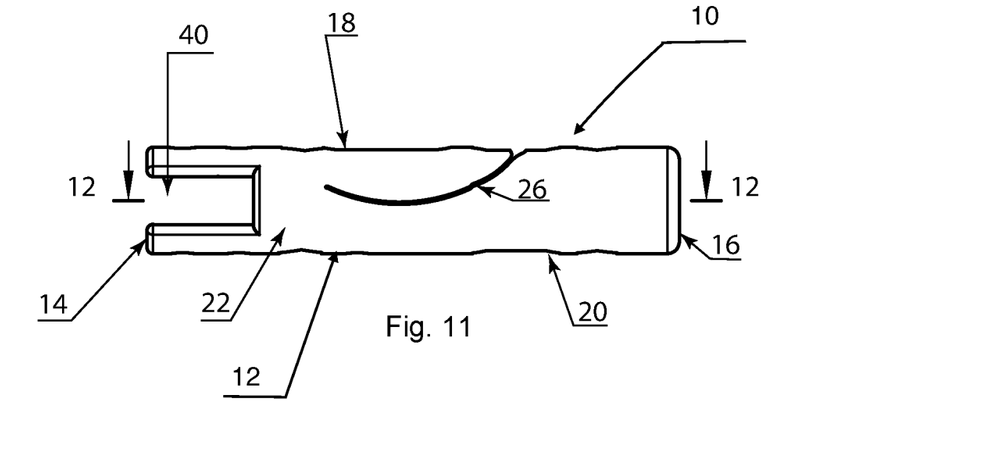
FIG. 11 is a plan view of the left side of the marking device holder shown in FIG. 1.
Figure 12:
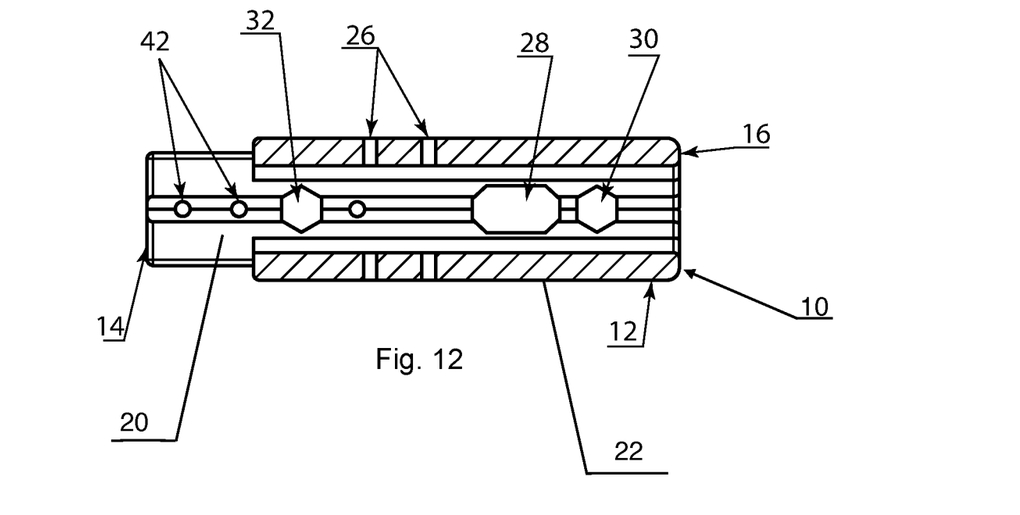
FIG. 12 is a cross-sectional view of the marking device holder shown in FIG. 1 taken along the plane 12-12 shown in FIG. 11, and looking down at the bottom side of the marking device holder.
Figure 13:
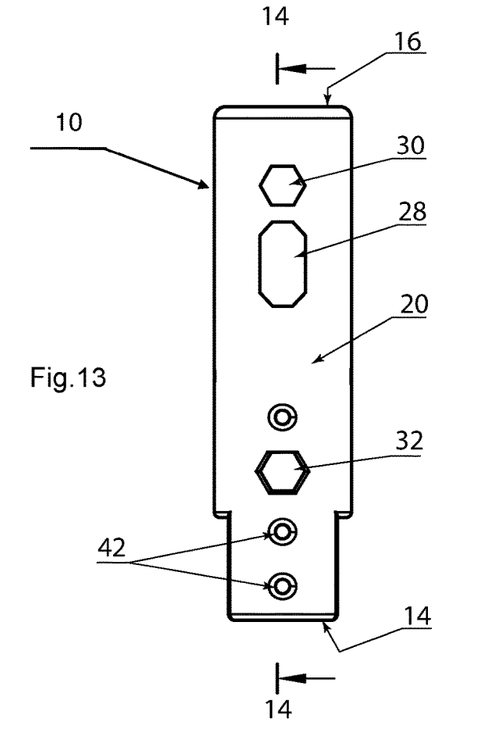
FIG. 13 is a plan view of the bottom side of the marking device holder shown in FIG. 1.
Figure 14:
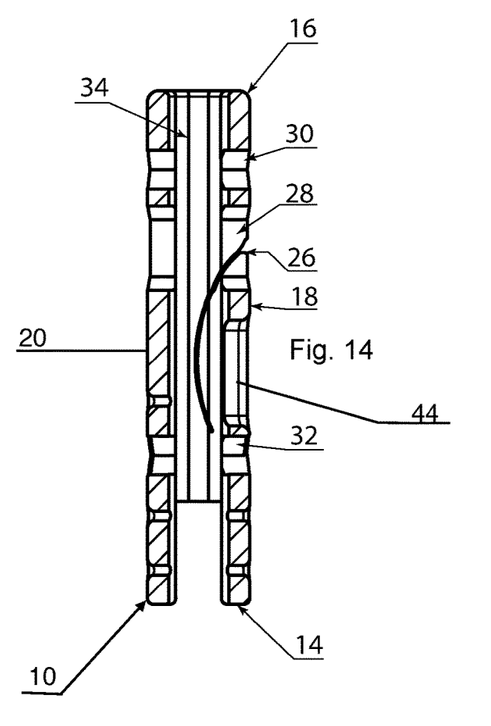
FIG. 14 is a cross-sectional view of the marking device holder shown in FIG. 1 taken along the plane 14-14 shown in FIG. 13.

The body 12 defines a lengthwise cavity 34 with an opening 36 at the first end 14 of the body 12 and an opening 38 at the second end 16 of the body 12. The cavity 34 has an axis that is parallel, and may be coincident, to the longitudinal axis 11 of the body 12 and is shaped and sized to hold a carpenter's pencil C as shown in FIGS. 5 and 6. The workman therefore can insert the marking device holder 10 over a marking device, such as the carpenter's pencil C, in order to keep those items together for transportation or when not in use. Alternatively, the cavity 34 can hold two no. 2 pencils P side-by-side. The cavity 34 is not perfectly cylindrical. Its walls define ridges and valleys adapted for holding a carpenter's pencil C or two no. 2 pencils P side-by-side.

Figure 3:
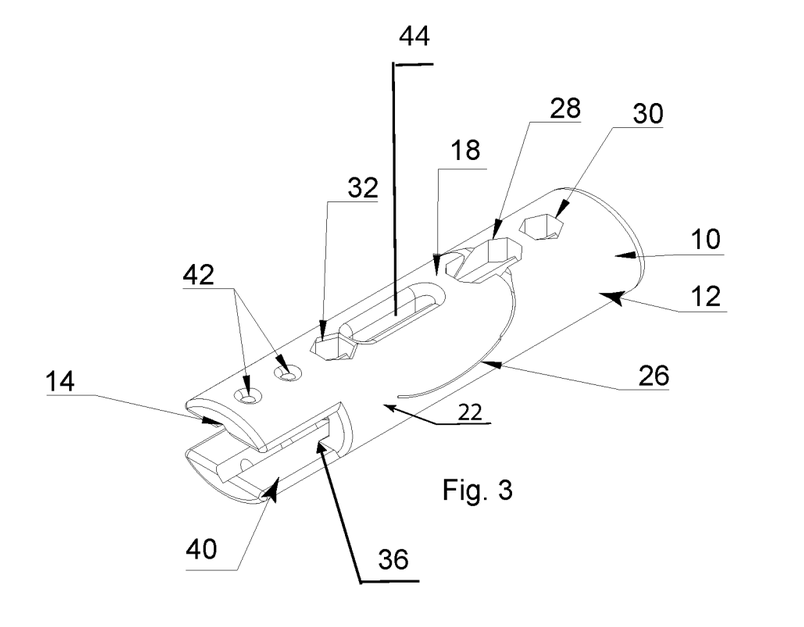
FIG. 3 is a perspective view of the upper left side of the marking device holder shown in FIG. 1.
Figure 4:
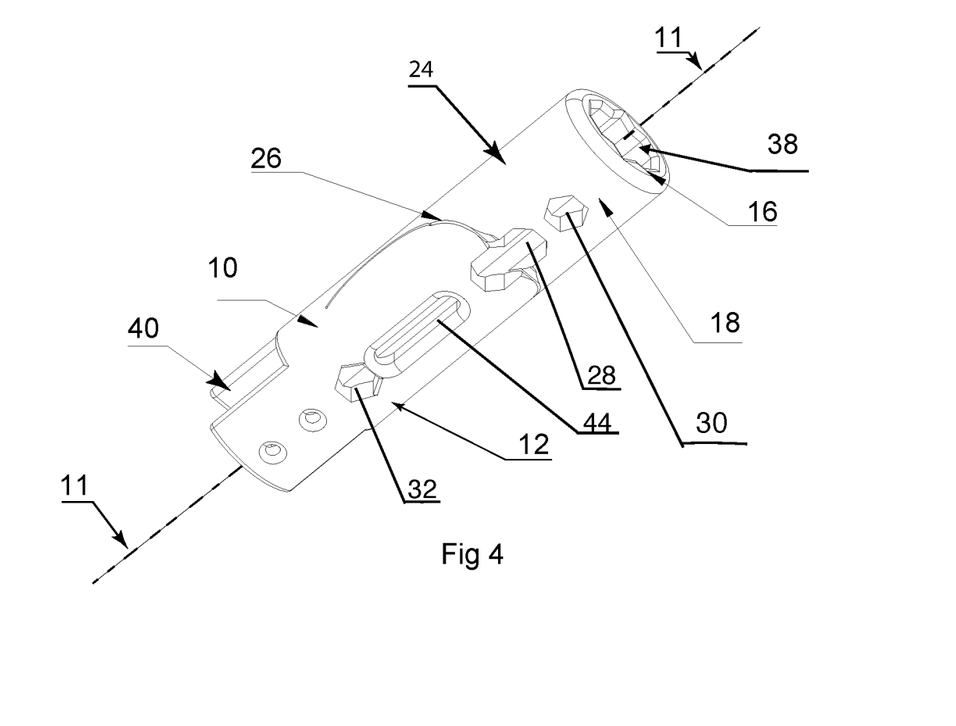
FIG. 4 is a perspective view of the upper right side of the marking device holder shown in FIG. 1.

A sight cavity 44 defined in the body 12 extends between the top side 18 and the cavity 26 in order to permit the user to view the tape 102 when the tape 102 is located in the cavity 26. The user will then be able to position the marking device holder 10 at a desired position on the tape 102 by examining the markings on the tape 102 through the sight cavity 44. As shown in FIGS. 3 and 4, the sight cavity 44 is located between the large marking device-receiving cavity 28 and the smaller marking device-receiving cavity 32.

Figures 15, 16:
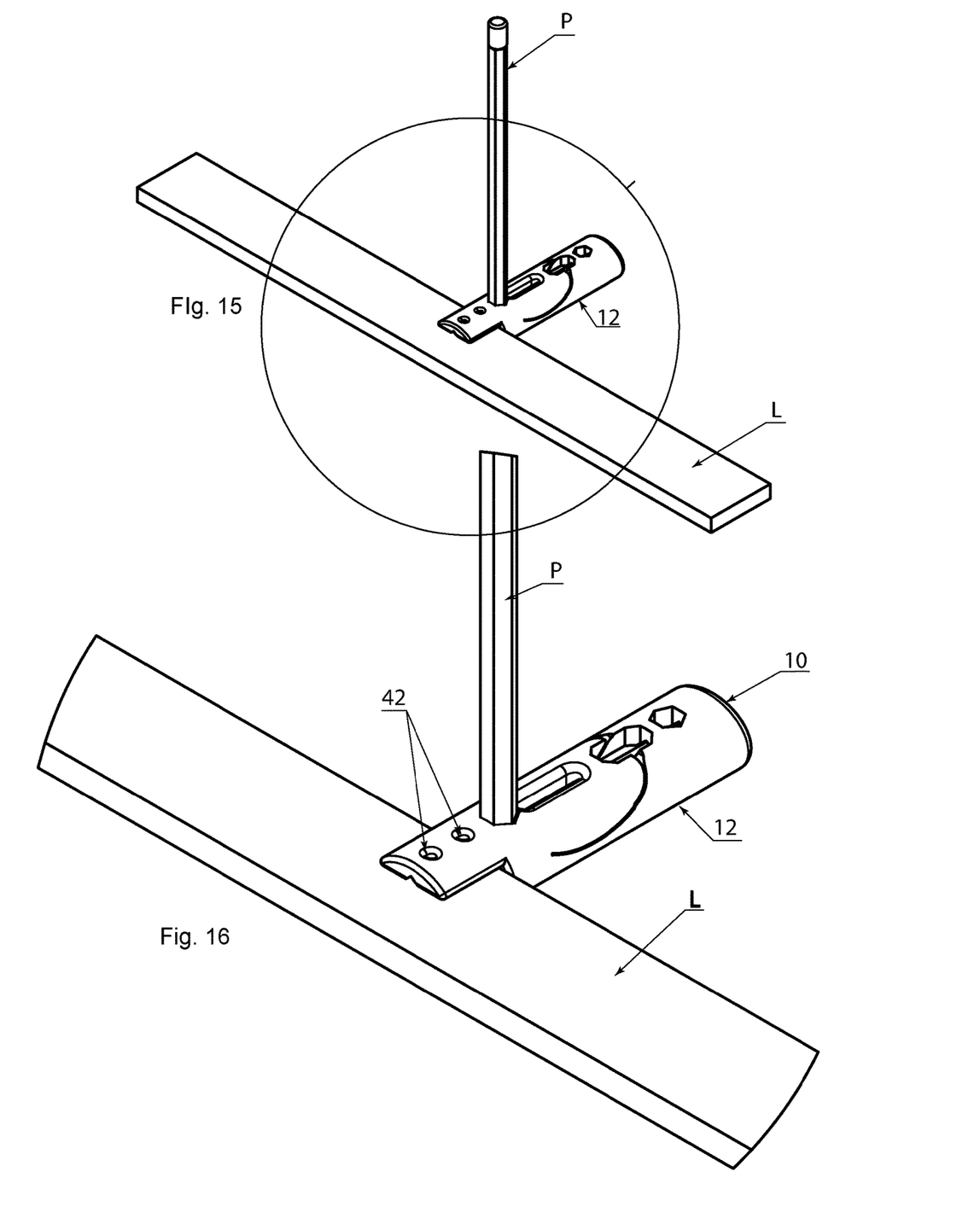
FIG. 15 is a perspective view of the left side of the marking device holder shown in FIG. 1, with a marking device in the form of a standard no. 2 pencil held in the marking device holder, and the marking device holder is releasably attached to a lath rather than the tape of a tape measure.
FIG. 16 is an expanded perspective view of the upper left side of the marking device holder, pencil, and lath of FIG. 15.

The end 14 of the body 12 preferably has rectangular cutouts 40 in the left side 22 and the right side 24 that permit a lath or thin board L to be inserted sideways into the opening 36, as shown in FIGS. 15 and 16. The insertion of the lath L will provide another way to mark lengths and arcs, as discussed below.

Figure 17:
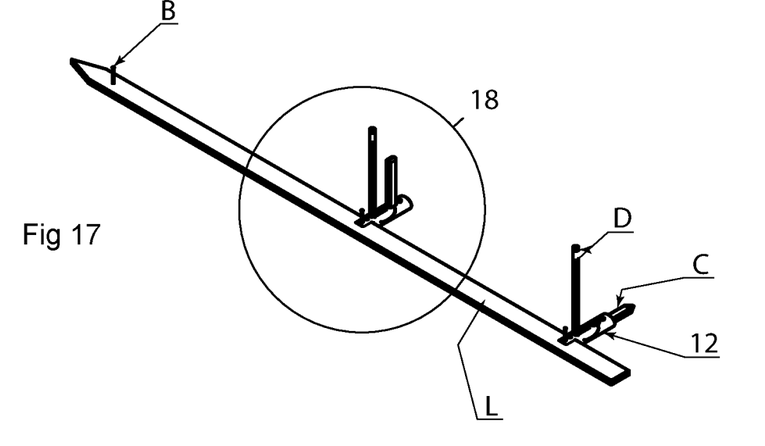
FIG. 17 is a perspective view of two of the marking device holder shown in FIG. 1, wherein the marking device holders attached to a lath and secured to the lath by nails such as brads, with one end of the lath being attached to a work piece with a nail such as a brad in order to draw circles or arcs on the work piece.
Figure 18:
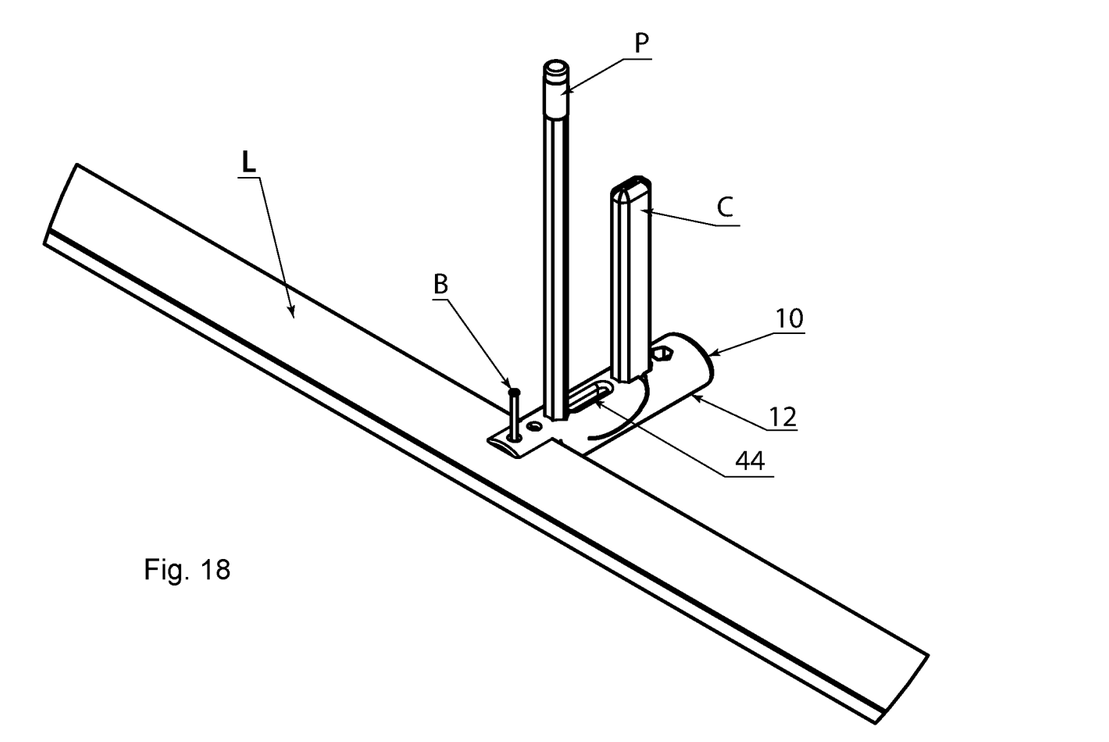
FIG. 18 is an expanded perspective view of a portion of FIG. 17, indicated by the circle 18 in FIG. 17, of one of the marking device holders shown in FIG. 17 showing how the marking device holder is both attached to the lathe and is holding a no. 2 pencil and a carpenter's pencil.

The cavities 42 are formed in the body 12 adjacent the first end 14 in the vicinity of the cutouts 40. The cavities 42 are directed transversely to the longitudinal axis 11. The cavities 42 are adapted to receive a nail such as a brad or thin nail B in order to secure the body 12 to the lath L as shown in FIGS. 17 and 18.

Operation of the Marking Device Holder

The workman attaches the marking device holder 10 to the tape 102 of a tape measure 100 by sliding an edge of the tape 102 into the crescent cavity or slot 26 as shown in FIGS. 1 and 2. Preferably the edge of the tape 102 should reach the end of the cavity 26 within the body 12 of the marking device holder 10 so the longitudinal axis 11 of the body 12 of the marking device holder 10 preferably is positioned perpendicular to the length of the tape 102 at the point of attachment. Also, preferably the side of the tape 102 with gradations should be uppermost and visible through the sight window 44. The longitudinal axis 11 preferably should be parallel to the plane defined by the edges of the tape 102 at the point of attachment. The marking device holder 10 may be attached to the tape at a desired location on the tape 102 according to the gradations marked on the tape, as viewed through the sight cavity 44. The marking device holder 10 may be slid up and down the tape 102 to reach the chosen location.

Following the attachment of the marking device holder 10 to the tape 102, a marking device may be inserted in one or more of the marking device-receiving cavities 28, 30, and 32. The workman inserts the marking device from the top side 18 through the chosen cavity to the bottom side 20 in order for the tip or pencil lead to emerge from the bottom side 20.

The workman moves the tape measure 100 and tape 102 to a chosen location on the work piece. The workman may mark the work piece at a chosen location by moving the marking device holder 10 from side to side with the tip of the marking device contacting the work piece. The workman could also move the tape 102 with the attached marking device holder 10 sideways in order to mark a length.

For marking circles and arcs the hook 104 of the tape 102 may be anchored or located at a selected point on the work piece. (Alternatively, the case 106 of the tape measure 100 may be anchored at the selected point.) The tape 102 and marking device holder 10 then may be rotated about the selected point in order to mark a circle or arc.

Instead of attaching the marking device holder 10 to the tape 102 of a tape measure 100, a lath L may be inserted sideways (or endwise) into the end 14 of the marking device holder 10 as shown in FIGS. 15-18. The lath L will fit into the rectangular cavities or cutouts 40 defined in the body 12. A brad B may be inserted through one of the cavities 42 and hammered into the lath L in order to secure the lath L to the marking device holder 10. The lath L may have been cut to a predetermined length so the marking devices C or P inserted through the body 12 can mark successive lengths. Alternatively, the workman may simply move the marking device holder 10 to a chosen position on the lath L.

The combination of the marking device holder 10 attached to a lath L may be used to mark circles and arcs. As shown in FIG. 17, the lath L may be rotatably attached to a work piece by driving a nail or brad B through the lath into a selected position on the work piece. The lath L and the marking device holder 10 may be rotated about that brad B in order to mark arcs or circles on the work piece.

The invention is intended to cover alternatives, modifications and equivalents that may be included within the spirit and scope of the invention as defined by the appended claims. For example, other materials than those mentioned above but having suitable properties and colors might be employed. The marking device holder could be milled or otherwise formed. It could be made as a single piece or a combination of pieces. The shape of the body could be tubular or like a rectangular parallelepiped or even an ornamental shape such as that of a fish. The lengthwise cavity may be omitted. The cutouts for receiving laths or the cavity for receiving the tape of a tape measure may be omitted if the marking device holder is to be used only with the tape of a tape measure or with a lath, respectively.

While the invention has been described in conjunction with the preferred embodiment, it will be understood that it is not intended to limit the invention to this embodiment or its particular manner of construction, materials or components.

What is claimed is:

1. A marking device holder for use with a tape measure of the kind that has a tape that reversibly extended from a case of the tape measure, comprising:
    a body defining a cavity adapted to releasably receive the tape and one or more cavities at an end of the body for receiving and holding a lath or thin board, and
    at least one marking device-receiving cavity defined in the body adapted to receive and releasably hold a marking device.

2. The marking device holder according to claim 1 wherein the marking device-receiving cavity is adapted to receive and hold a marking device generally orthogonal to a length of the tape.

3. The marking device holder according to claim 1 wherein the marking device-receiving cavity is adapted to receive a pencil.

4. The marking device holder according to claim 1 wherein the body has a longitudinal axis and the cavity in the body that releasably receives the tape is adapted to hold the longitudinal axis of the body generally orthogonal to the length of the tape.

5. The marking device holder according to claim 1 wherein the cavity adapted to releasably receive the tape is crescent-shaped and is open at a side of the body.

6. The marking device holder according to claim 1 wherein the body has a longitudinal axis and defines a cavity along the longitudinal axis that is open at an end of the body and is adapted to receive and releasably hold a marking device.

7. A marking device holder for use with a tape measure of the kind that is a curved transversely when the tape is extended from a case of the tape measure, whereby the tape has a concave side and a convex side, and the concave side has distance markings on the concave side of the tape, comprising:
    a body having a longitudinal axis and first and second ends spaced from and joined to each other by a top side, a bottom side, a left side, a right side,
    the body defining a cavity in the top side, the left side, and the right side adapted for receiving and releasably holding the tape whereby the longitudinal axis of the body is transverse to the tape and the concave side of the tape faces the top side of the body and the convex side of the tape faces the bottom side of the body,
    the body defining at least one marking device-receiving cavity running between the top side and the bottom side of the body and adapted to receive and hold a marking device orthogonal to a length of the tape, wherein the at least one marking device-receiving cavity is adapted to adjoin the cavity for receiving and releasably holding the tape whereby a marking device inserted into the marking device-receiving cavity will contact the tape and prevent the tape from departing or sliding through the cavity for receiving and releasably holding the tape.

8. The marking device holder according to claim 7 wherein the cavity for receiving and releasably holding the tape is curved in a crescent shape as viewed from either the left side or the right side of the body.

9. The marking device holder according to claim 7 wherein a sight cavity is defined in the body between the top side of the body and the cavity for receiving and releasably holding the tape whereby a user may view the distance markings on the concave side of the tape.

10. The marking device holder according to claim 7 wherein the at least one marking device-receiving cavity is adapted to receive a carpenter's pencil.

11. The marking device holder according to claim 7 wherein the at least one marking device-receiving cavity is adapted to receive a no. 2 pencil.

12. The marking device holder according to claim 7 wherein the body defines a central cavity running between an opening defined in the first end and an opening defined in the second end.

13. The marking device holder according to claim 12 wherein the central cavity is adapted to releasably receive and hold a carpenter's pencil or two number two pencils side-by-side.

14. The marking device holder according to claim 7 wherein the body defines a rectangular cavity in one of the first end and the second end and running between the left side and the right side of the body whereby the rectangular cavity is adapted for receiving and releasably holding a lath or thin board.

15. The marking device holder according to claim 14 wherein a cavity adapted to receive a nail is defined in the body between the top side of the body and the rectangular cavity whereby the nail may be driven through the nail-receiving cavity in order to contact a lath or thin board received in the rectangular cavity and thereby retain the lath or thin board in a selected position with respect to the body.

16. A marking device holder, comprising:
   a body having a longitudinal axis running between first and second ends of the body that are spaced from each other,
   the body defining a rectangular cavity in one of the first end and the second end adapted for releasably receiving and holding a lath or thin board,
   the body defining at least one marking device-receiving cavity adapted to receive and hold a marking device orthogonal to a longitudinal axis of the lath and wherein the body defines a cavity adapted for receiving and releasably holding a tape of a tape measure whereby the longitudinal axis of the body is transverse to the tape.

17. The marking device holder according to claim 16 wherein a cavity adapted to receive a nail is defined in the body adjacent and orthogonal to the rectangular cavity in the one of the first end and the second end whereby the nail may be driven through the nail-receiving cavity in order to contact the lath or thin board received in the rectangular cavity and thereby retain the lath or thin board in a selected position with respect to the body.

18. A marking device holder for use with a tape measure of the kind that is a curved transversely when the tape is extended from a case of the tape measure, whereby the tape has a concave side and a convex side, and the concave side has distance markings on the concave side of the tape, comprising:
   a body having a longitudinal axis and first and second ends spaced from and joined to each other by a top side, a bottom side, a left side, a right side,
   the body defining a cavity in the top side, the left side, and the right side adapted for receiving and releasably holding the tape whereby the longitudinal axis of the body is transverse to the tape and the concave side of the tape faces the top side of the body and the convex side of the tape faces the bottom side of the body,
   the body defining at least one marking device-receiving cavity running between the top side and the bottom side of the body and adapted to receive and hold a marking device orthogonal to a length of the tape,
   wherein the body defines a rectangular cavity in one of the first end and the second end and running between the left side and the right side of the body whereby the rectangular cavity is adapted for receiving and releasably holding a lath or thin board.

19. The marking device holder according to claim 18 wherein a cavity adapted to receive a nail is defined in the body between the top side of the body and the rectangular cavity whereby the nail may be driven through the nail-receiving cavity in order to contact a lath or thin board received in the rectangular cavity and thereby retain the lath or thin board in a selected position with respect to the body.

\* \* \* \* \*